Sept. 16, 1958 F. F. JOHNSON 2,852,696
APPARATUS FOR INVESTIGATING EARTH FORMATIONS
Filed Dec. 20, 1954
FIG.1
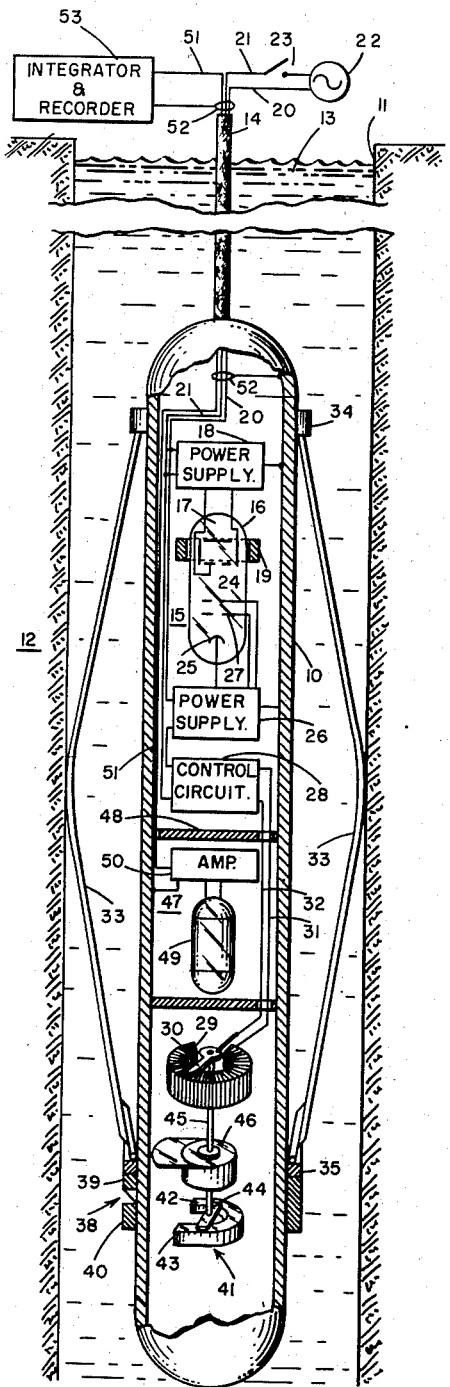
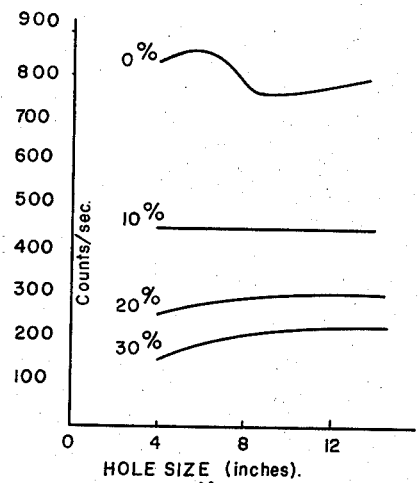
(b)
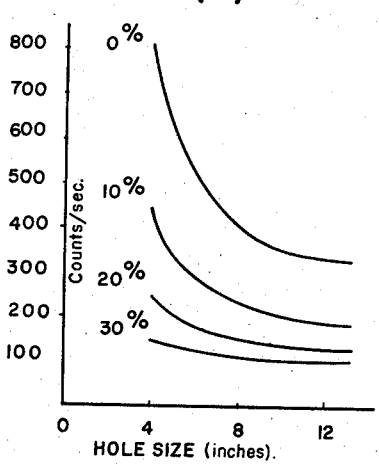
(a)
FIG.2
INVENTOR.
FRANK F. JOHNSON.
BY Robert Hockfield
HIS ATTORNEY.

United States Patent Office

2,852,696
Patented Sept. 16, 1958

2,852,696

APPARATUS FOR INVESTIGATING EARTH FORMATIONS

Frank F. Johnson, Danbury, Conn., assignor, by mesne assignments, to Schlumberger Well Surveying Corporation, Houston, Tex., a corporation of Texas Application December 20, 1954, Serial No. 476,378

7 Claims. (Cl. 250—83.6)

This invention relates to apparatus for investigating earth formations traversed by a borehole and, more particularly, pertains to certain improvements in radioactivity logging apparatus of the type including a source of radiant energy adapted to be passed through the borehole and means for obtaining indications of a phenomenon resulting from irradiation of the earth formations by the source.

Radioactivity logging apparatus including a source of radiant energy and a detector for obtaining indications of a phenomenon resulting from irradiation of formations by the source provides useful information concerning earth formations traversed by a borehole and, in general, has achieved a large measure of commercial success. While such apparatus is, for the most part, satisfactory, the indications obtained depend to a large extent on the hydrogenous material in the vicinity thereof. Since a borehole usually contains a hydrogenous drilling liquid, as a water or oil base mud, it is evident that variations in borehole diameter cause changes in the amount of hydrogenous material present and the accuracy of the indications may be adversely affected.

It is, therefore, an object of the present invention to provide certain improvements in apparatus for investigating earth formations traversed by a borehole whereby the apparatus is not subject to the foregoing deficiency.

Another object of the present invention is to provide new and improved apparatus of the type including a source of radiant energy and a detector for obtaining indications of a phenomenon resulting from irradiation of earth formations by the source in which the effects of variations in the diameter of a borehole through which the apparatus may be passed are minimized.

Apparatus in accordance with the present invention is adapted for the investigation of earth formations traversed by a borehole subject to variations in diameter and comprises a source of radiant energy having a characteristic of adjustable magnitude or intensity adapted to traverse the borehole. Means are provided for adjusting the magnitude of the aforesaid characteristic of the radiant energy in accordance with the diameter of the borehole. The apparatus further comprises means for obtaining indications of a phenomenon resulting from irradiation of earth formations adjacent the borehole.

The novel features of the present invention are set forth with particularity in the appended claims. The present invention, both as to its organization and manner of operation, together with further objects and advantages thereof, may best be understood by reference to the following description taken in connection with the accompanying drawing in which:

Fig. 1 is a view in longitudinal cross section of apparatus for investigating earth formations traversed by a borehole constructed in accordance with the present invention; and Figs. 2(a) and (b) are curves representing the uncorrected and corrected response of logging apparatus in which the invention may be incorporated.

As shown in Fig. 1, apparatus embodying the present invention comprises a pressure resistant housing 10 adapted to be passed through a borehole 11 traversing a plurality of earth formations 12. Borehole 11 usually contains a hydrogenous drilling fluid 13, such as a water base or oil base mud, and it may be lined with one or more strings of metallic casing (not shown) or it may be uncased as illustrated.

Housing 10 is suspended in the borehole by means of an armored cable 14 which, in connection with a winch (not shown) located at the surface of the earth, may be employed to lower and raise the housing in the borehole in the customary manner.

Supported within housing 10 is a source of radiant energy, such as a neutron generator 15, which may be like the one disclosed in the copending application of Clark Goodman, filed March 11, 1952, bearing the Serial Number 275,932, and assigned to the same assignee as the present invention or, as illustrated, may be of the type disclosed in the copending application of Wayne R. Arnold, filed March 8, 1954, bearing the Serial Number 414,761, and assigned to the present assignee. Thus, neutron generator 15 comprises an evacuated envelope 16 filled with an ionizable gas, such as the isotope of hydrogen known as deuterium. Envelope 16 encloses electrodes of an ion source 17 connected to a power supply 18 and the envelope is enclosed by a cylindrical magnet 19. The power supply is connected by insulated conductors 20 and 21 of cable 14 to a source of alternating current 22 provided with an operating switch 23.

Ions derived by source 17 pass through an opening in an electrode 24 which together with the target 25 comprises an accelerating gap for generator 15 connected to a high voltage power supply 26. Target 25 is loaded with tritium if neutrons at an energy of 14 million electron volts (m. e. v.) are desired; however, deuterium may be employed if neutrons at approximately 3.5 m. e. v. are required. Interposed between electrode 24 and target 25 is another electrode 27 suitably connected to power supply 26 so that it operates as a secondary electron repeller.

Power supply 26 is energized by source 22 via a control circuit 28 which may be of conventional construction or of the type described in the aforementioned Arnold application. The control circuit operates on power supply 26 in such a manner that the accelerating potential applied between electrodes 24 and 25 may be regulated. Thus, a characteristic, such as the neutron flux derived by generator 15, is of adjustable magnitude.

Also supported within housing 10 is a rheostat having a resistance element 29 and a movable contact 30 which is displaced in accordance with variations in the diameter of borehole 11. Accordingly, a control effect is derived which is responsive to variations in the borehole diameter. Rheostat 29, 30 is connected by leads 31 and 32 to control circuit 28 so that the apparatus is provided with means for adjusting the magnitude of the neutron flux generated by source 15 in accordance with the control effect. The circuit is arranged in a known manner so that the acceleration potential for generator 15 varies directly with borehole diameter thereby to effect a corresponding variation in the resulting neutron flux.

Any well-known mechanism may be provided to position contact 30 relative to resistance element 29 in accordance with borehole diameter. For example, an arrangement similar to that described in the copending application of Maurice P. Lebourg, filed March 30, 1954, bearing the Serial Number 419,740, and assigned to the same assignee as the present invention, may be employed. On July 12, 1955, that application matured into Patent No. 2,712,697. With such an arrangement, housing 10 may be maintained pressure-tight because a motion-transmitting element extending through the housing is not needed. To this end, a plurality of angularly spaced, arched springs 33 are pivotally connected at their upper and lower extremities, respectively, to junctions which may be in the form of collars 34 and 35. The collars 34 and 35 are slidably mounted on the exterior surface of housing 10 to which longitudinally spaced stop members (not shown) are secured to permit restricted longitudinal movement of the collars with respect to the housing. A suitable keying arrangement (not shown) is provided for preventing relative rotation between collar 35 and housing 10 as the apparatus is moved through the borehole.

At least in the vicinity of its lower end, housing 10 is constructed of a non-magnetic material and supports a first, sleeve-like magnetic circuit element 38 arranged for longitudinal, sliding movement along the exterior surface of the housing together with collar 35. Element 38 includes a pair of pole sections 39 and 40 of opposite magnetic polarities and of substantially spiral configuration relative to a longitudinal axis for housing 10 and cooperates with a second magnetic circuit element 41 positioned interiorly of the housing. Element 41 is a horse-shoe type magnet having its legs 42 and 43 constituting a pair of pole sections of opposite magnetic polarities arranged to coact in opposed polarity relation with the pole sections 39 and 40 of magnetic circuit element 38. Magnet 41 is secured to a support 44 connected to a vertical shaft 45 aligned with the longitudinal axis of housing 10 and rotatably mounted by means of a bearing 46. The upper end of shaft 45 is connected to wiper arm 30 of rheostat 29, 30.

In order to obtain indications of a phenomenon resulting from irradiation of earth formations 12 adjacent borehole 11, housing 10 is provided with a detector compartment 47 separated from the portion of the housing containing neutron generator 15 by a suitable shield plate 48 designed to minimize a selected type of radiation which might pass into compartment 47 from generator 15. Where the phenomenon to be observed is gamma radiation, a detector 49, such as a Geiger-Mueller tube, may be supported within compartment 47 and coupled to an amplifier 50 connected via a lead 51 and a shield 52 of cable 14 to an integrator and recording unit 53 at the surface of the earth. The unit 53, for example, may comprise a capacitor for deriving a potential representing the number of pulses applied per unit time and a recording voltmeter to which this potential is applied. The recording medium on the voltmeter is displaced in a customary manner in proportion to movement of housing 10 through borehole 11 so that a continuous log may be obtained.

In operation, housing 10 is lowered into borehole 11 and after a selected depth is obtained, switch 23 is closed, thereby energizing power supplies 18 and 26 which, in turn, energize neutron generator 15. Ions of deuterium gas derived within ion source 17 pass through electrode 24 and are subjected to the high accelerating potential provided by power supply 26 and thus are accelerated to velocities sufficient to effect neutron-producing reactions upon impingement with tritium in target 25. The neutrons thus generated irradiate formations 12 and a resulting nuclear phenomenon may produce gamma radiation. For example, neutrons may be inelastically scattered or may be captured and the resulting gamma radiation may, in part, travel toward housing 10 and some of the returning gamma radiation is intercepted by detector 49. The resulting pulses are amplified in stage 50 and supplied to integrator-recorder unit 53, and a continuous log of gamma radiation as a function of depth is obtained.

Since, as is usually the case, borehole 11 is not of constant diameter and as housing 10 is drawn upwardly, bowed springs 33 contract and expand to accommodate such changes. Accordingly, with collar 34 against its stop (not shown), collars 35 and 38 move upwardly and downwardly along the housing and magnet 41 rotates to assume a position of least reluctance between poles 39, 40, 42 and 43. Shaft 45 is rotated in accordance with longitudinal movement of element 38 and resulting variations in the resistance of rheostat 29, 30 operate on control circuit 28 to adjust the potentials applied by power supply 26 to accelerating gap 24, 25. In this way, the neutron output of generator 15 is continuously adjusted in such a manner that borehole size is less influential in the neutron-gamma log obtained with the illustrated apparatus than heretofore possible. Thus, by increasing neutron output with borehole size, the response of the apparatus embodying the present invention may be made substantially independent of borehole size under selected conditions.

To best illustrate the advantages of the invention, reference is made to Fig. 1. Fig. 1($a$) represents the variation of detected signal versus borehole diameter for an instrument not incorporating the invention. In contrast, Fig. 1($b$) shows the increase in accuracy which may be obtained, for example, where the resistance of rheostat 29, 30 as a function of the position of arms 33 is suitably selected and the instrument calibrated and adjusted so that for formation porosities of 10%, the record of counts per second in unit 53 remains substantially constant over a range of borehole sizes between four and twelve inches. However, the accuracy of indications is improved over prior apparatus through a range of porosities, such as from 0 to 30%. Obviously, a similar adjustment may be made for other porosities of interest.

If desired, other types of output control for generator 15 may be employed. For example, control circuit 28 may be associated with power supply 18 for the electrodes of ion source 17, rather than power supply 26. In this way the current in the ion source is adjusted in accordance with borehole diameter to derive the required neutron output control.

While apparatus embodying the present invention has been illustrated in connection with the control of a neutron generator, obviously other types of radiant energy generators may be similarly operated. For example, the output flux of a gamma ray generator may be controlled in gamma-gamma density logging apparatus.

Alternatively, a generator of the type utilizing a stream of highly accelerated electrons impinging upon a suitable target to produce X-rays may be employed. In this case the control exerted on the generator by control circuit 28 may be effective to regulate another characteristic, such as the energy of the resulting X-radiation.

Of course, although relatively simple neutron-gamma logging apparatus has been illustrated, the invention may find application in more complex arrangements, such as apparatus for obtaining a spectrum of returning gamma radiation. In this connection, an increase in borehole size causes an increase in the ratio of captures in the borehole to captures in the formation and also reduces the probability of detecting gamma rays from the formations. Thus, the influence of the larger boreholes may be reduced by increasing neutron output with borehole size in the manner described hereinbefore. The same considerations also apply to logging in which the induced radioactivity is measured by making observations at intervals of time which are spaced from one another thereby to obtain a decay curve.

Moreover, if desired, a suitable neutron monitor (not shown) may be provided in the manner suggested in the aforementioned Arnold application for operating control circuit 28. Accordingly, the high energy neutron output of generator 15 may be adjusted by control circuit 28 so as to maintain a selected ambient level of neutron flux above and below which variations occur in response to borehole diameter. Alternatively, the ambient level may be established by a thermal neutron detector arranged to respond to neutrons slowed by formations 12 and returned toward housing 10.

It will be noted that the position of collar 35 is a non-linear function of borehole diameter. Thus, if such a non-linearity is suitable for the control of neutron flux, rheostat 29, 30 may have a linear taper. If a borehole gauge of the type providing a linear relationship is employed, the taper of rheostat 29, 30 may be selected accordingly. In many cases, a non-linear relationship of diameter versus neutron flux is desirable. For example, in the illustrative embodiment, this relationship may be a curve derived by obtaining the arithmetic difference between abscissae values of the curves designated "10%" in Figs. 2(a) and 2(b).

The term "radiant energy" as used herein is intended to denote both particle energy, such as neutrons, as well as wave energy, such as gamma radiation, and thus is not to be construed as being limited to any specific type.

While a particular embodiment of the present invention has been shown and described, it is apparent that changes and modifications may be made without departing from this invention in its broader aspects, and therefore the aim in the appended claims is to cover all such changes and modifications as fall within the true spirit and scope of this invention.

I claim:

1. Apparatus for investigating earth formations traversed by a borehole comprising: a source of radiant energy having a characteristic of adjustable magnitude adapted to traverse a borehole; means for adjusting the magnitude of said characteristic of said radiant energy in accordance with a physical dimension of the borehole; and means for obtaining indications of a phenomenon resulting from irradiation of earth formations adjacent the borehole by said source.

2. Apparatus for investigating earth formations traversed by a borehole comprising: a generator of neutrons providing a neutron flex of adjustable magnitude adapted to traverse a borehole; means for deriving a control effect responsive to variations in the diameter of the borehole; means for adjusting the magnitude of said neutron flux in accordance with said control effect; and means for obtaining indications of a phenomenon resulting from irradiation of earth formations adjacent the borehole by neutrons from said generator.

3. Apparatus for investigating earth formations traversed by a borehole comprising: a neutron generator including a source of charged particles and a target and means for accelerating said charged particles toward said target with a velocity dependent upon an adjustable acceleration potential supplied to said generator, said target being comprised of a substance adapted to react with accelerated particles to produce neutrons whereby the flux of such neutrons is dependent upon said acceleration potential; means for adjusting said acceleration potential to regulate said flux in accordance with borehole diameter; and means for obtaining indications of a phenomenon resulting from irradiation of earth formations by neutrons from said generator.

4. Apparatus for investigating earth formations traversed by a borehole subject to variations in diameter comprising: a source of radiant energy having a characteristic of adjustable magnitude adapted to traverse a borehole; a borehole caliper for displacing a control element in accordance with variations in the diameter of the borehole; means responsive to the position of said control element for adjusting the magnitude of said characteristic of said radiant energy; and means for obtaining indications of a phenomenon resulting from irradiation of earth formations adjacent the borehole by said source.

5. Apparatus for investigating earth formations traversed by a borehole subject to variations in diameter comprising: a source of radiant energy having a characteristic of adjustable magnitude adapted to traverse a borehole; means for deriving a control effect responsive to variations in the diameter of the borehole and varying with a predetermined non-linear relationship with variations in the diameter; means for adjusting the magnitude of said characteristic of said radiant energy in accordance with said control effect; and means for obtaining indications of a phenomenon resulting from irradiation of earth formations adjacent the borehole by said source.

6. Apparatus for investigating earth formations traversed by a borehole subject to variations in diameter comprising: a source of radiant energy having a characteristic of adjustable magnitude adapted to traverse a borehole; means for controlling said source in response to variations in the diameter of the borehole to increase the flux of said radiant energy with an increase in the diameter of the borehole and to decrease the flux of said radiant energy with a decrease in the diameter of the borehole; and means for obtaining indications of a phenomenon resulting from irradiation of earth formations adjacent the borehole by said source.

7. Apparatus in accordance with claim 1 wherein said characteristic is the energy of said radiant energy.

References Cited in the file of this patent

UNITED STATES PATENTS

| | | |
|---|---|---|
| 2,648,778 | Silverman et al. | Aug. 11, 1953 |
| 2,689,918 | Youmans | Sept. 21, 1954 |